United States Patent [19]

Maaz et al.

[11] Patent Number: 4,798,251
[45] Date of Patent: Jan. 17, 1989

[54] ELECTRONIC BALANCE WITH SCALE ON TOP AND CORNER-LOAD ADJUSTMENT

[75] Inventors: Günther Maaz, Uslar; Eduard Bierich, Hann-Münden; Eberhard Stadler, Göttingen, all of Fed. Rep. of Germany

[73] Assignee: Sartorius GmbH, Fed. Rep. of Germany

[21] Appl. No.: 176,630

[22] Filed: Apr. 1, 1988

[30] Foreign Application Priority Data

Apr. 1, 1987 [DE] Fed. Rep. of Germany ....... 3710997

[51] Int. Cl.⁴ ...................... G01G 3/08; G01G 23/14
[52] U.S. Cl. .................................. 177/229; 177/164
[58] Field of Search ............................. 177/164, 229

[56] References Cited

U.S. PATENT DOCUMENTS

| | | | |
|---|---|---|---|
| 4,153,126 | 5/1979 | Knothe et al. | 177/229 |
| 4,383,586 | 5/1983 | Lee | 177/229 |
| 4,561,512 | 12/1985 | Tramposch | 177/229 |
| 4,606,421 | 8/1986 | Schroeder | 177/229 X |
| 4,679,642 | 7/1987 | Brock et al. | 177/229 X |
| 4,697,658 | 10/1987 | Scheffer et al. | 177/164 X |
| 4,723,615 | 2/1988 | Luchinger | 177/164 |
| 4,732,228 | 3/1988 | Danhamer | 177/164 |

Primary Examiner—George H. Miller, Jr.
Attorney, Agent, or Firm—Eric P. Schellin

[57] ABSTRACT

The invention discloses an electronic balance with a scale on top, a balance scale, a balance scale carrier, two identical guide rods (7,8) which connect in an articulated manner the balance scale carrier and the balance scale in the form of a parallel guide to a system carrier (1/5) fixed to the housing and with at least one corner-load adjustment lever (22') which is connected to the system carrier via a thin area (24) and which carries a support point in the vicinity of this thin area (24) for the end of a guide rod (7) on the system carrier that the corner-load adjustment lever (22') is bent at right angles between the support point of the guide rod (7) and the thin area (24) to the system carrier (1,5) in such a manner that the moving joint (17) of the guide rod (7) and this thin area (24) are at the same height. As a result, even great forces in the guide rods such as those which occur at an off-center loading of the balance scale do not cause any torque on the corner-load adjustment lever and thus result in a very stable corner-load adjustment.

6 Claims, 2 Drawing Sheets

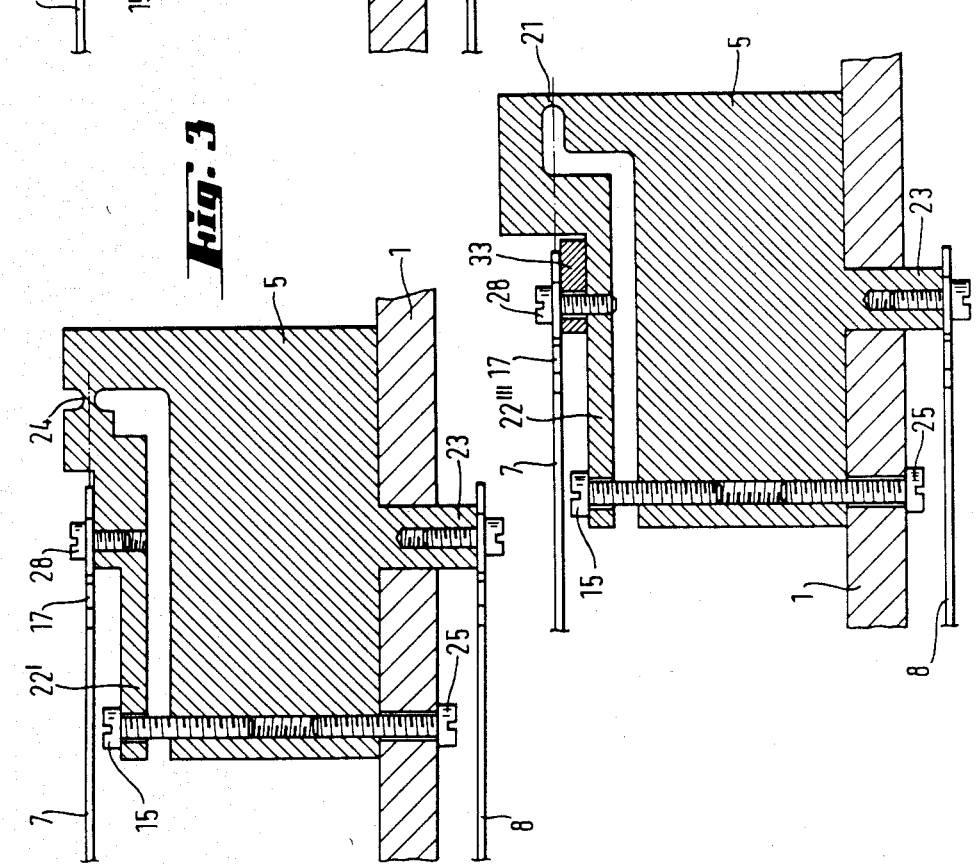

ELECTRONIC BALANCE WITH SCALE ON TOP AND CORNER-LOAD ADJUSTMENT

BACKGROUND OF THE INVENTION

The invention relates to an electronic balance with a scale on the top, a balance scale, a balance scale carrier, two identical guide rods which connect in an articulated manner the balance scale carrier and the balance scale in the form of a parallel guide to a system carrier fixed to the housing and with at least one corner-load adjustment lever which is connected to the system carrier via a thin area and which carries a support point in the vicinity of this thin area for the end of the guide rod on the system carrier.

Balances of this type are known e.g. from DE-GM No. 84 09 629 or DE-OS No. 32 18 529.

A disadvantage of the known designs is the fact that non-linear corner-load errors occur in the case of very off-center loads on the scale, that is, in the case of great forces on the guide rods of the parallel guide. These corner-load errors are caused by the fact that the corner-load adjustment levers bend on account of the forces exerted by the guide rods and on account of their own elasticity, whereby they change the corner-load adjustment.

The invention therefore relates to a design for a balance of the type initially mentioned which does not exhibit any corner-load errors, even if the scale is loaded very off-center.

SUMMARY OF THE INVENTION

The invention solves the stated problem by bending the corner-load adjustment lever at right angles between the support point of the guide rod and the thin area to the system carrier in such a manner that the moving joint of the guide rod and this thin area are at the same height.

As a result of this measure, the lever arm with which the guide rod forces load the corner-load adjustment lever and cause it to bend becomes zero, wherewith the bending moment in the corner-load adjustment levers automatically becomes zero.

It is advantageous if the guide rods are also designed so that their neutral axis is located at the same height as the particular moving joint of the guide rod and the thin area located between the corner-load adjustment lever and the system carrier. The forces of pressure and of traction which are transmitted from the scale carrier via the guide rod and its fastening position on the corner-load adjustment lever to the system carrier then result neither in the guide rod nor in the corner-load adjustment lever in bending moments, which greatly increases the stability in the case of off-center loading of the scale.

It is advantageous if the thin area between the corner-load adjustment lever and the system carrier is formed by a milling from above and from below so that the height of the thin area can be varied somewhat by the selection of the particular milling depth. This results in a possibility of adjustment for the height of the thin area so that the same height can be precisely maintained even in the case of great manufacturing tolerances.

In an alternative advantageous embodiment, the cornerload adjustment lever is bent at right angles somewhat more sharply than is necessary in order to achieve the same height of the moving joint of the guide rod and of the thin area of the corner-load adjustment lever. This difference in height is then cancelled out again by means of inserting a platelet between the guide rod and the corner-load adjustment lever and manufacturing tolerances can be compensated by selecting the thickness of this platelet and the correct height of the moving joint of the guide rod in relation to the thin area of the corner-load adjustment lever can be achieved.

If the thin area between the corner-load adjustment lever and the system carrier does not consist of a "concentrated thin area" but rather of a rather large thin-area section, then the problem of the invention is solved in that the corner-load adjustment lever is bent at right angles between the support point of the guide rod and the thin area to the system carrier in such a manner that the moving joint of the guide rod and the effective center of rotation of the corner-load adjustment lever are at the same height. Thus, instead of the concentrated thin area, the effective center of rotation of the thin-area section is brought in this instance to the same height as the moving joint of the guide rod.

It is advantageous if the one section of the thin area is reinforced by a reinforcing metal sheet so that the effective center of rotation of the corner-load adjustment lever can be varied somewhat in its height by selecting the thickness of the reinforcing metal sheet. This makes a simple adjustment possible for the same height in this embodiment too.

BRIEF DESCRIPTION OF THE DRAWINGS

The invention is described in the following with reference made to the schematic figures.

FIG. 3 shows a detail of the measuring system in another embodiment.

FIG. 4 a detail of the measuring system in a third embodiment.

FIG. 5 shows a detail of the measuring system in a fourth embodiment.

Figure 1:
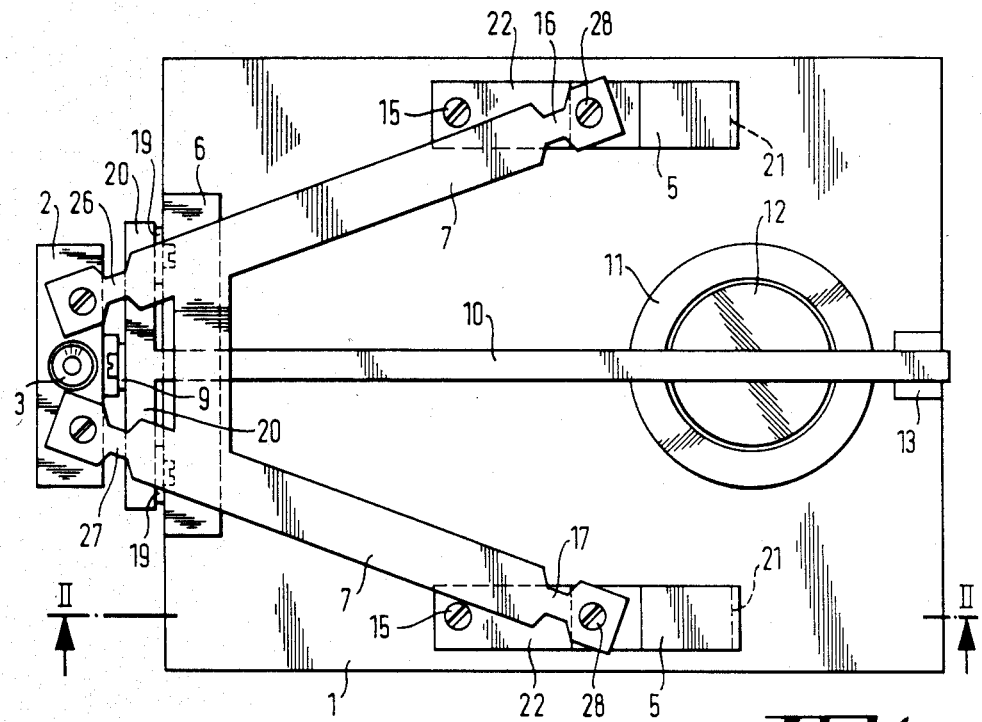
FIG. 1 shows a top view of the measuring system of an electronic balance with scale on top.
Figure 2:
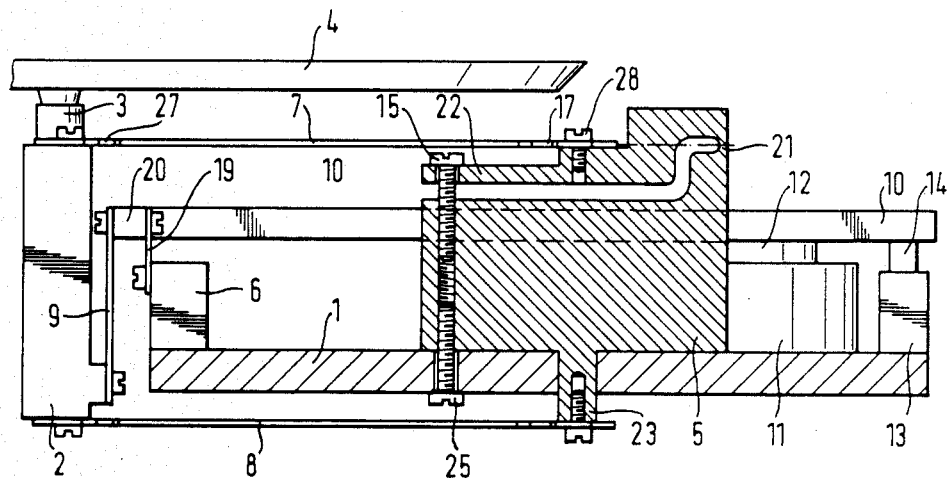
FIG. 2 shows a section along line II—II in FIG. 1.

The measuring system of an electronic balance with scale on top shown in FIGS. 1 and 2 comprises a system carrier composed of plate 1 and two mounting blocks 5. Each mounting block 5 is fastened to plate 1 by a screw 25. Cornerload adjustment levers 22 are connected to mounting blocks 5 via a thin area 21. Two symmetrically designed guide rods 7,8 are fastened to corner-load adjustment levers 22 and to lower part 23 of mounting block 5 by moving joints 16,26 and 17,27, which rods guide balance scale carrier 2 in a vertical direction in the form of a parallel guide. Scale carrier 2 carries scale 4 via intermediary piece 3, which scale is not shown in FIG. 1 for the sake of clarity. The force of the weight of the material to be weighed on scale 4 is transmitted via coupling band 9 to the shorter lever arm of translation lever 10/20. The translation lever comprises a cross traverse 20 on which it is pivotably mounted via two flexible springs 19 on square end 6 fastened to plate 1. Coil 12 is fastened to the longer lever arm of the translation lever, extends into the air gap of permanent magnet system 11 and generates the weight-proportional counteracting force. An automatic gain control amplifier with position sensor 13/14 regulates the current through coil 12, whereby stationary part 13 of the position sensor is also fastened to plate 1. The electronic circuitry of the electromagnetic compensation of force is generally known and will therefore not be explained in detail here.

The parallelity of the two guide rods 7,8 is adjusted by adjusting screw 15. This pivots corner-load adjustment lever 22 somewhat about thin area 21. A vertical adjustment at screw 15 changes the height of guide rod fastening point (screw 28) in a correspondingly more sensitive manner through the longer lever arm to screw 15. Corner-load adjustment lever 22 is now bent at right angles between the guide rod fastening point (screw 28) and thin areas 21 as connection to mounting block 5 in such a manner that moving joint 17 of guide rod 7 is at the same height as thin area 21. Thus, horizontal forces from the guide rod do not result in a torque on corner-load adjustment lever 22 and therefore also do not cause any bending of corner-load lever 22.

Furthermore, guide rods 7,8 are also designed in such a manner in FIGS. 1,2 that their neutral axis is at the same height as moving joints 16,26 and 17,27. As a result, the horizontal forces in the guide rods also do not result in any bending moments in this instance either.

Another embodiment of the corner-load adjustment lever is shown in FIG. 3. The parts which are the same as in FIG. 2 are designated in the same manner. Corner-load adjustment lever 22' is connected here via thin area 24 to mounting block 5 of the system carrier. Thin area 24 is formed by a milling from above and one from below, which makes it readily possible to adapt the height of thin area 24 to the height of guide rod moving joint 17.

A third embodiment of the corner-load adjustment lever is shown in FIG. 4. The parts which are the same as in FIG. 2 are again designated in the same manner. Cornerload adjustment lever 22''' is bent more sharply at right angles in this embodiment than is actually necessary. The sharper bending at right angles is cancelled out by platelet 33 between guide rod 7 and corner-load adjustment lever 22''' to the extent that moving joint 17 of guide rod 7 is at the same height as thin area 21 of corner-load adjustment lever 22'''. Manufacturing variations can be readily obviated.

FIG. 5 shows a fourth embodiment of the corner-load adjustment lever. Again, the parts which are the same as in FIG. 2 are designated in the same manner.

Corner-load adjustment lever 22'' is connected here in such a manner to mounting block 5 that no concentrated thin area is created but rather a fairly large rather thin area. This thinner rather thin area is formed by area 31 and also by area 30, which is not quite as thin but nevertheless exhibits a noticeable flexibility due to its length. Area 30 is furthermore reinforced by reinforcing metal sheet 29 fastened by screws 32 to the back side of mounting block 5. In this embodiment, the thinnest area 31 is located distinctly above moving joint 17 of guide rod 7, to wit, so far above it that the effective center of rotation for corner-load adjustment lever 22'', which is determined both by area 31 and also by area 30 together with reinforcing metal sheet 29, is located precisely at the height of moving joint 17 of guide rod 7. In this manner, manufacturing variations can then be compensated by mounting a somewhat thicker or a somewhat thinner reinforcing metal sheet 29.

It is, of course, also possible not to have any adjustability. Area 30 is then made so thick that thinnest area 31 and area 30 result in a center of rotation for the corner-load adjustment lever which is located exactly at the height of moving joint 17 of guide rod 7.

What is claimed is:

1. In an electronic balance with a scale on top, a balance scale (4), a balance scale carrier (2), two identical guide rods (7,8) which connect in an articulated manner the balance scale carrier and the balance scale in the form of a parallel guide to a system carrier (1/5) fixed to the housing and with at least one corner-load adjustment lever (22,22',22'') which is connected to the system carrier via thin area (21,24,30/31) and which carries a support point in the vicinity of this thin area for the end of a guide rod on the system carrier, comprising that the corner-load adjustment lever (22,22',22'',22''') is bent at right angles between the support point of the guide rod (7) and the thin area (21,24,30/31) to the system carrier (1/5) in such a manner that the moving joint (16,17) of the guide rod (7) and the thin area (21,24,30/31) are at the same height.

2. Electronic balance with scale on top according to claim 1, wherein the guide rods (7,8) are designed so that their neutral axis is at the same height as the moving joint (16,26,17,27) of the guide rod (7,8) and the thin area (21,14,30/31) between the corner-load adjustment lever (22,22',22'') and the system carrier (1/5).

3. Electronic balance with scale on top according to claim 1, wherein the thin area (24) between the corner-load adjustment lever (22') and the system carrier (1/5) is formed by a milling from above and a milling from below so that the height of the thin area (24) can be somewhat varied by selecting the particular milling depth.

4. Electronic balance with scale on top according to claim 1, wherein a platelet (33) is inserted between each corner-load adjustment lever (22''') and guide rod (7) and that the moving joint (16,17) of the guide rod (7) can be brought to the correct height in relation to the thin area (21) of the corner-load adjustment lever (22''') by selecting the thickness of this platelet (33).

5. Electronic balance with scale on top according to claim 1, wherein the corner-load adjustment lever (22'') is bent at right angles between the support point of the guide rod (7) and the thin area (30/31) to the system carrier (1/5) in such a manner that the moving joint (16,17) of the guide rod (7) and the effective center of rotation of the corner-load adjustment lever (22'') are at the same height.

6. Electronic balance with scale on top according to claim 5, wherein the section (30) of the thin area (30/31) is reinforced by a reinforcing metal sheet (29) so that the effective center of rotation of the corner-load adjustment lever (22'') can be somewhat varied in its height by selecting the thickness of the reinforcing metal sheet (29).

* * * * *